ELECTRICALLY-POWERED VEHICLE HAVING INTERCONNECTED POWER AND BRAKE CONTROLS
Filed Nov. 7, 1960 4 Sheets-Sheet 1
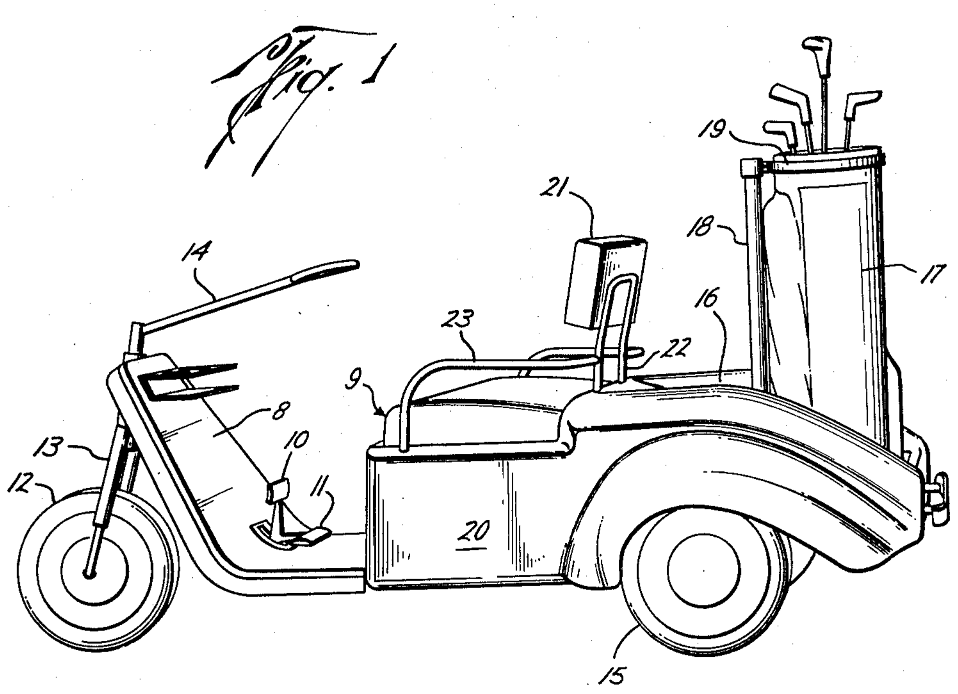
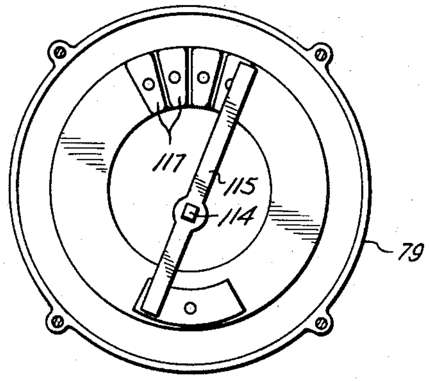
Fig. 6
INVENTOR.
Orville H. Landreth
BY
Bertram H. Mann
ATTORNEY Jan. 14, 1964 O. H. LANDRETH 3,117,648

ELECTRICALLY-POWERED VEHICLE HAVING INTERCONNECTED POWER AND BRAKE CONTROLS

Filed Nov. 7, 1960 4 Sheets-Sheet 2

INVENTOR.
Orville H. Landreth
BY Bertram H. Mann
ATTORNEY

Jan. 14, 1964 O. H. LANDRETH 3,117,648

ELECTRICALLY-POWERED VEHICLE HAVING INTERCONNECTED POWER AND BRAKE CONTROLS

Filed Nov. 7, 1960 4 Sheets-Sheet 3

INVENTOR.

Orville H. Landreth

BY

Bertram H. Mann

ATTORNEY

Jan. 14, 1964 O. H. LANDRETH 3,117,648

ELECTRICALLY-POWERED VEHICLE HAVING INTERCONNECTED POWER AND BRAKE CONTROLS

Filed Nov. 7, 1960 4 Sheets-Sheet 4

INVENTOR.

Orville H. Landreth

BY Bertram H. Mann

ATTORNEY

United States Patent Office 3,117,648

Patented Jan. 14, 1964

3,117,648

ELECTRICALLY-POWERED VEHICLE HAVING INTERCONNECTED POWER AND BRAKE CONTROLS

Orville Homer Landreth, 7902 Glen Prairie, Houston 17, Tex.

Filed Nov. 7, 1960, Ser. No. 67,568
2 Claims. (Cl. 180—55)

This invention relates to small, relatively light, and highly maneuverable vehicles of the type used, for instance, as golf carts for carrying golf clubs and/or players around the golf links or as industrial transportation. The invention consists more particularly in an electrically-powered vehicle of this type in which there is provided a compact powering package specifically designed for the vehicle and which may be readily installed and replaced without the exercise of a very great degree of skill.

Present vehicles of this type, usually, are assembled from available components which were not originally designed for such use. For instance, the power units and/or transmissions, frequently, are designed for much heavier duty and, consequently, do not operate efficiently when so assembled. Furthermore, V-belt drives are customary, even though such drives are inherently inefficient. Thus, where a battery-powered motor is used, the life of the batteries is substantially less than it should be due to the inefficiencies of the car and its powering means. For instance, some carts of this type at present on the market are designed only for 65% to 75% of efficiency, and where adjustments, which may be made by inexperienced persons, are not accurate, the efficiency may be 50% or less. This is a great disadvantage in battery powered vehicles, since it results in wastage of battery energy and reduced battery life. A golf cart with a dead battery, in the middle of a golf course is a poor advertisement for the vehicle.

Accordingly, it is the main object of the present invention to provide an electric-powered vehicle, especially adapted for use as a golf cart, industrial transportation vehicle, or the like, in which the powering unit operates at maximum efficiency so as to provide for maximum battery life.

It is another object to provide a powering unit for a small, light, maneuverable vehicle in which all adjustments are permanently built into the unit to insure maximum efficiency thereof as well as simplicity of installation and replacement.

Still another object is to provide a rigid, compact, combination powering and braking unit for vehicles of the type described which embodies maximum simplicity as well as efficiency and ruggedness.

According to my present invention, a unitary powering package is provided which consists of a lubricant casing in which there is mounted differential gearing from which project wheel mounting axle parts. Also journalled in the casing and projecting thereinto are a pair of countershafts upon which sprockets are mounted, these sprockets being connected to the main drive sprocket of the differential by means of drive chains. One of the countershafts is powered by a motor which is rigidly secured to and supported by the casing, and the other, preferably an intermediate speed countershaft, mounts braking means. Suitable speed and braking controls are located in the driver's compartment. The powering and braking unit is carried upon an individual frame which is pivotally secured to the rear of the chassis and upon which the rear end of the chassis is supported as by air springs.

In the accompanying drawings which illustrate the invention, FIG. 1 is a perspective side view of a golf cart embodying the invention.

FIG. 6 is a similar section taken on line 6—6 of FIG. 4.

Figure 2:
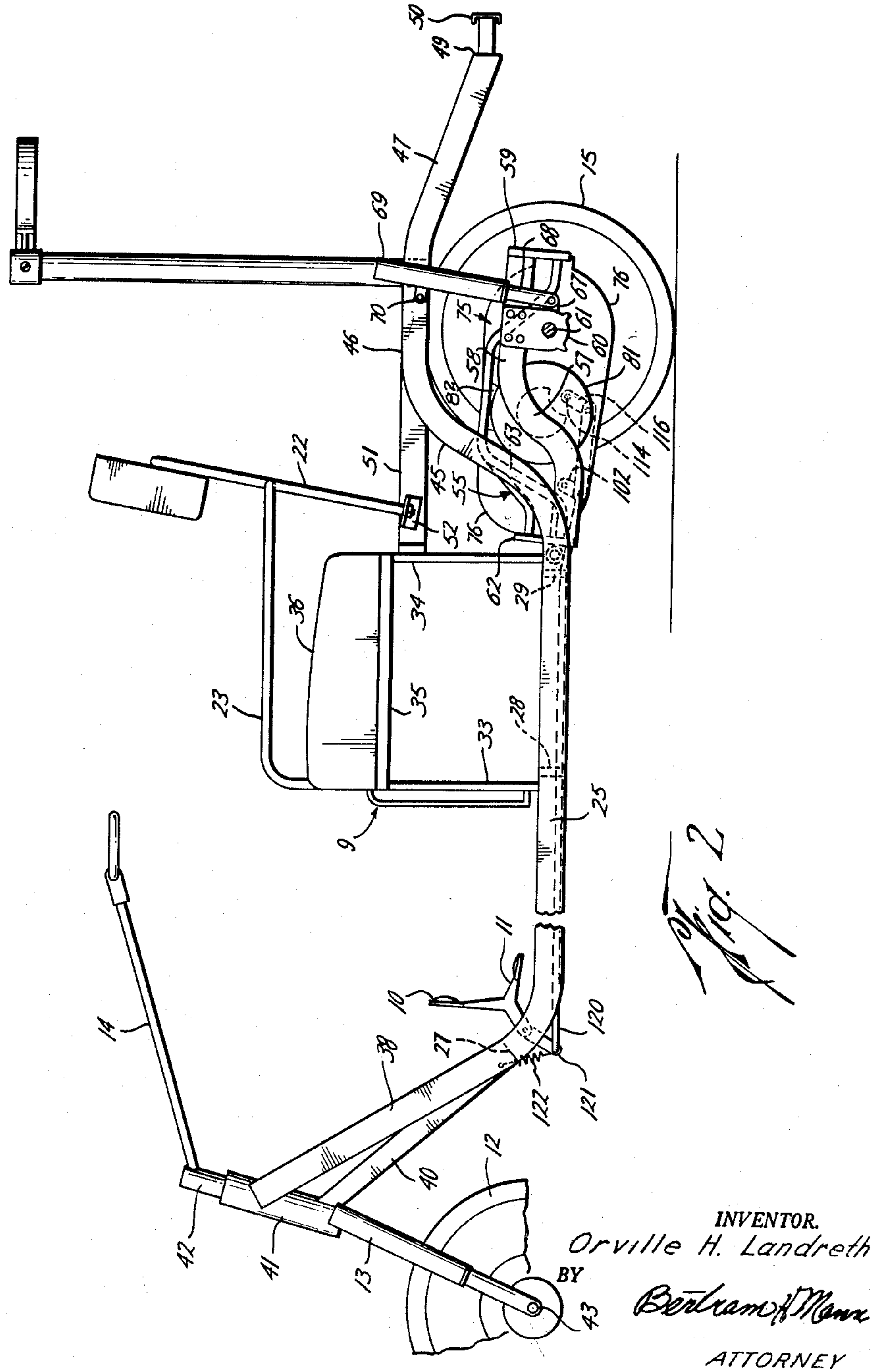
FIG. 2 is a side view of the chassis and powering parts of the vehicle.

The cart in FIG. 1 includes a body portion having a forward floor 8 and seat 9 defining a driver's compartment. A combination accelerator and brake pedal 10 and 11 projects through the flooring. The front end of the vehicle is supported on a single front wheel 12 by means of a fork 13 which is directionally controlled by a steering lever 14. The rear of the vehicle, supported upon rear wheels 15, has a space 16 for accommodating a golf bag 17. A vertical post 18 has a top clamp 19 for supporting the bag. The rear part of the vehicle is substantially enclosed by body sheathing 20. A driver's back rest 21 is supported by rigid tubing 22 and 23.

Figure 3:
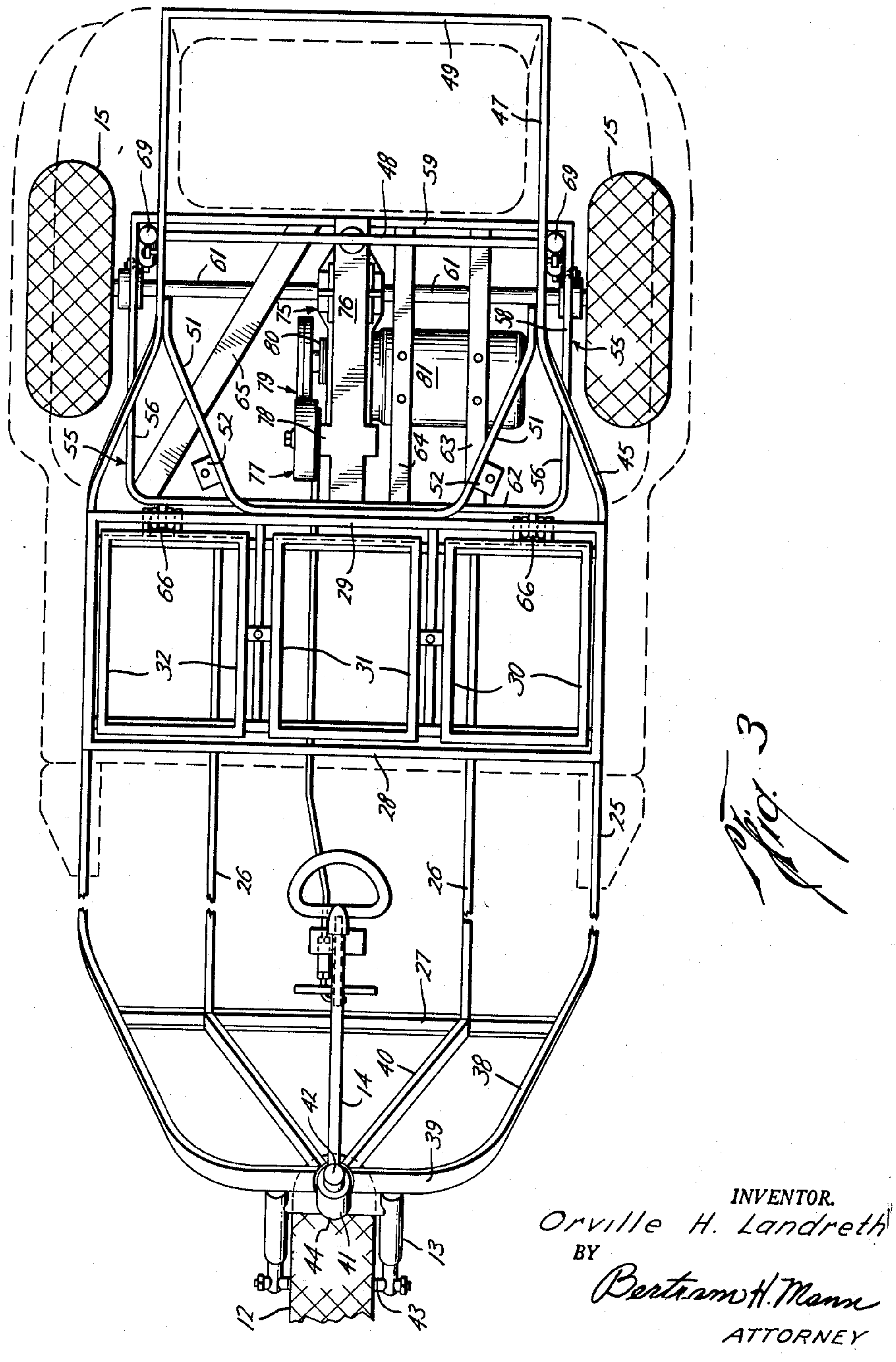
FIG. 3 is a top view of the parts in FIG. 2.

As shown in FIGS. 2 and 3, the chassis or underframe which supports the vehicle body, includes longitudinal side sill channels 25 and intermediate longitudinals 26 rigidly connected by cross members 27, 28, and 29. Members 28 and 29 are additionally connected by longitudinals 30, 31, and 32 to form a rigid support for the powering batteries. Upstanding members 33 and 34 support seat members 35 and 36.

Side sills 25 incline upwardly at their forward extremities, as at 38, and then extend transversely, as at 39. Intermediate longitudinals 26 also incline upwardly at their forward extremities, as at 40, and the framing portions 39 and 40 are centrally secured, as by welding, to the steering sleeve 41. Rotatably received in sleeve 41 is the steering column 42 which, at its lower extremity, is secured to fork 13 mounting a stub axle 43 at its lower extremity, upon which is received the front wheel 12. Steering lever 14 projects from column 42 toward the driver's seat.

The rearward extremities of side sills 25 curve upwardly, as at 45, then extend horizontally rearwardly, as at 46, then incline downwardly, as at 47, and are joined intermediately by cross piece 48 and at their rear ends by the end sill piece 49 and bumper 50 (FIG. 2). Corner braces 51 extend from the rear center portion of seat-forming framing 34 to portions 46 of the side sills. Brackets 52 on braces 51 mount seat back supporting tubes 22.

The rear portion of the chassis is supported upon a frame or carriage generally designated 55 and consisting of side longitudinals 56 which have intermediate, upwardly-inclined portions 57, and rearward, horizontal portions 58 joined by end member 59. Brackets 60, bolted to side members 56–58, journal axle sections 61, upon which are mounted rear wheels 15. A transverse member 62 extends across the front of the frame or carriage, and intermediate upwardly-bowed, longitudinal channels 63 and 64 connect the rear and forward members 59 and 62 below i.e., at the side of the center line of the frame (FIG. 3). A diagonal channel 65 braces the upper part of the carriage (FIG. 3).

Forward transverse member 62 of carriage 55 is pivotally connected to rearward transom 29 of the chassis by means of hinges 66 so that frame or carriage 55 is articulated with respect to the main chassis. A bracket 67 projecting rearwardly from each axle journalling bracket 60 pivotally mounts a link 68 upon which is supported an air spring mechanism, generally designated 69. Each air spring mechanism is, in turn, pivotally secured by means of a bracket 70 to the intermediate portion 46 of the upwardly disposed, rearward portion of the corresponding chassis side sill member 25. Mounted on the carriage front and rear members 62 and 59 along the center line of the vehicle is the unitary power package generally designated 75 and including, in general, the main lubricant casing 76, a brake 77 supported on boss 78, a motor control 79 supported on boss 80, and a main powering motor 81 secured to the side of the casing and supported by means of brackets 82 from intermediate longitudinals 63 and 64.

Figure 4:
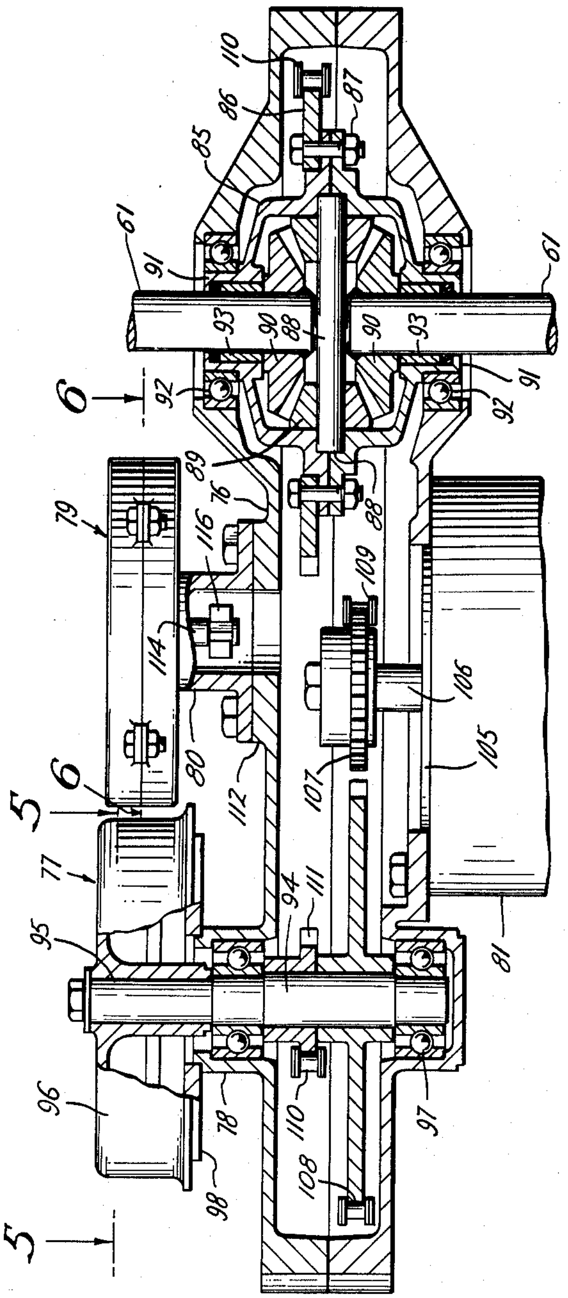
FIG. 4 is an enlarged horizontal section through the powering unit.

The unitary power and braking package is best shown in FIG. 4. In the rear part of casing 76 there is mounted differential gearing, including the housing 85, to which the main driving sprocket 86 is secured by means of bolts 87. A stub shaft 88 journalled in housing 85 mounts pinions 89 which connect side bevel gears 90 secured to the inner extremities of axle sections 61. Housing 85 has oppositely projecting bosses 91 journalled in casing 76 by means of ball bearings 92 and themselves journalling the axle section by means of bearings 93.

Figure 5:
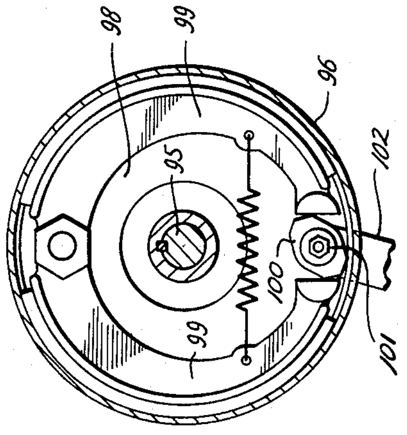
FIG. 5 is a detail vertical longitudinal section taken on line 5—5 of FIG. 4.

A countershaft 94 extends through the opposite extremity of casing 76 and has sidewardly projecting part 95 extending into and secured to brake drum 96. The countershaft is journalled in ball bearings 97. As shown in FIGS. 4 and 5, a disc 98 on boss 78 pivotally mounts curved shoes 99 which may be urged outwardly into frictional engagement with drum 96 by a double cam 100 on a pintle 101 actuated by a short lever 102. Shaft 94 mounting the brake operates at an intermediate speed between the motor and wheel axle speeds. This results in improved braking over the more customary mounting of the brake on the high speed motor shaft.

An electric motor, generally designated 81, is secured to casing 76 about a side opening 105 therein, and its shaft 106 projects into the casing and carries sprocket 107 aligned with sprocket 108 on countershaft 94. A flexible drive chain 109 connects sprockets 107 and 108. A second flexible drive chain 110 connects a sprocket 111 on countershaft 94 to sprocket 86 on differential housing 85. Accordingly, both wheeled rear axle sections 61, through the differential, and braking countershaft 94, are powered by the motor.

Controller 79 (FIGS. 4 and 6) is secured by means of boss 80 to a pad 112 on the side of casing 76 adjacent the brake. Controller shaft 114 is rigid with a switching arm 115 inside the controller casing and an actuating lever 116 outside this housing. Contacts 117 within the housing successively vary the resistance in the motor energizing circuit, as arm 115 is rotated to vary the speed of the motor.

A rod 120 connects lever 121 pivotally mounted on the forward portion of the chassis with brake actuating lever 102 and also controller actuating lever 116. Lever 121 includes accelerator pedal 10 and braking pedal portion 11, these being arranged so that when lever 121 is rotated counterclockwise, as shown in FIGURE 2, due to forward pressure applied to pedal portion 10, the brake is positively released and controller shaft 114 is rotated counterclockwise in the direction for increasing the motor speed. When accelerator pedal 10 is released, lever 121 is rotated clockwise by a spring, schematically represented at 122, which rotates lever 102 and cam 100 in the direction to apply the brake and, at the same time, rotate controller shaft 114 in the direction to reduce the speed of the motor. If further braking pressure is needed, the operator can press downwardly on brake pedal portion 11.

Thus, the complete powering and braking mechanism is applied as a single, rigid unit to the articulated frame or carriage 55. This unit is intended to be supplied intact by the manufacturer so that no adjustments are needed or easily possible. Furthermore, the drive motor and transmission mechanism, including the differential gearing, are all designed specifically for the particular load conditions encountered with this kind of vehicle. Consequently, the vehicle operates at maximum efficiency with the result that the life of the energizing batteries is maximum. Casing 76, preferably, will contain a suitable lubricant. In the present instance, the casing is sealed and it is contemplated that the initial lubricant supply will last the life of the vehicle. It is contemplated that the gearing and brake mechanisms will be sufficiently rugged in the initial installation to last substantially the normal life of this type of vehicle. Various details may be modified as will occur to those skilled in the art and exclusive use of all modifications as come within the scope of the appended claims is contemplated.

I claim:

1. In a vehicle, a chassis having a driver's compartment portion, speed and braking controls mounted on said portion, a battery mounted on said chassis, wheel mounting axle means secured to the forward part of said chassis, a frame pivotally connected to an intermediate part of said chassis and extending along the rear part thereof, springing means supporting said chassis rear part on said frame, a power unit mounted on said frame, said unit comprising a single sealed casing, a differential in said casing, wheel-mounting axle members projecting sidewardly from said differential through said casing and journalled in said frame, a pair of countershafts projecting from said casing, an electric motor carried by said frame and powering one of said countershafts, motor control means mounted on said casing, brake means connected to said casing and mounted on the other countershaft, actuating means for said brake means, transmission means in said casing interconnecting said differential and said axle members and means interconnecting said brake actuating means and said control means whereby the speed of the electric motor will be reduced in response to the actuation of said brake means.

2. An electric powered driving unit for vehicles comprising, a sealed casing adapted to be connected to a vehicle, differential gearing supported in said casing, a drive axle operatively connected with said differential gearing, the ends of said axle extending outwardly from each side of said casing adjacent one end thereof and adapted to be connected to the drive wheels of the vehicle, a pair of countershafts extending into and journaled in the walls of said casing, an electric motor supported on said casing for driving a first one of said countershafts, brake means including a brake drum mounted on said other countershaft for rotation therewith and means secured to said casing adjacent said other countershaft for pivotally supporting a pair of brake shoes, actuating means for said brake shoes control means mounted on said casing for controlling said electric motor, transmission means connnecting said countershafts with said differential gearing for driving said differential gearing, and means interconnecting said brake actuating means and said control means whereby the speed of the electric motor will be reduced in response to the actuation of said brake means.

References Cited in the file of this patent

UNITED STATES PATENTS

| | | |
|---|---|---|
| 1,026,098 | Liebau | May 14, 1912 |
| 1,046,681 | Towson | Dec. 10, 1912 |
| 1,097,358 | Peck | Mar. 19, 1914 |
| 1,165,848 | Chiville | Dec. 28, 1915 |
| 1,572,060 | Yarnall | Feb. 9, 1926 |
| 1,984,831 | Higley | Dec. 18, 1934 |
| 2,207,447 | Viles et al. | July 9, 1940 |
| 2,275,050 | Lewis | Mar. 3, 1942 |
| 2,844,209 | Brunderman | July 22, 1958 |
| 2,966,951 | Lang | Jan. 3, 1961 |

FOREIGN PATENTS

| | | |
|---|---|---|
| 480,366 | Canada | Jan. 22, 1952 |
| 549,637 | France | Nov. 25, 1922 |
| 67,987 | Switzerland | May 1, 1914 |